Oct. 10, 1939.   E. J. ROACH   2,175,648
BLOW-OUT PREVENTER FOR CASING HEADS
Filed Jan. 18, 1937
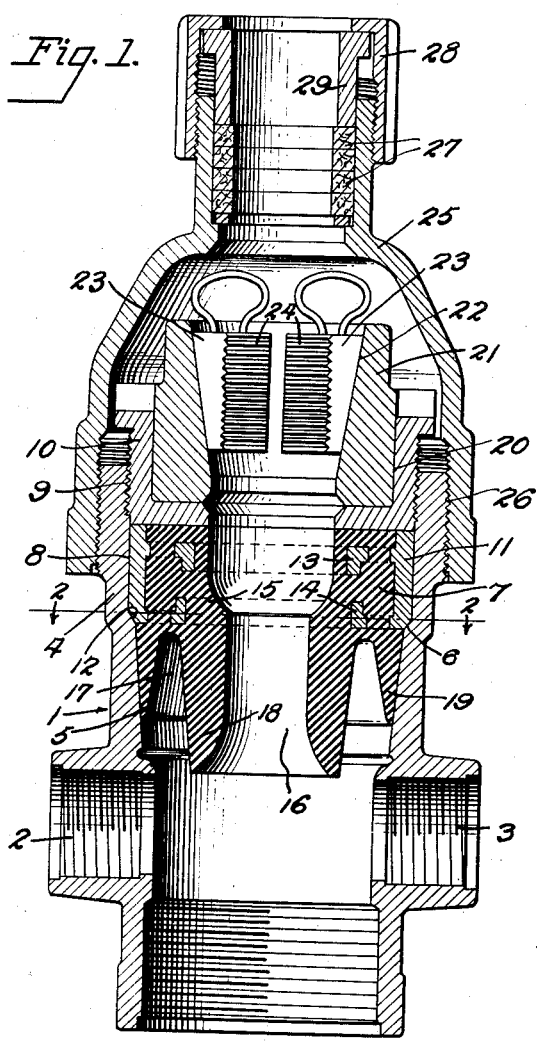
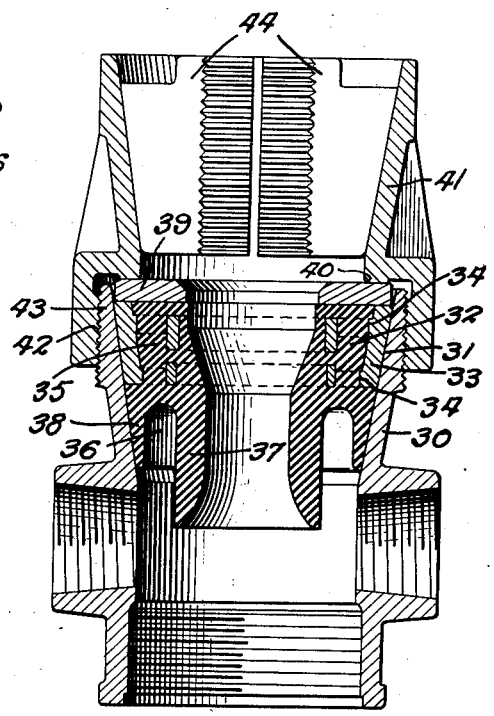
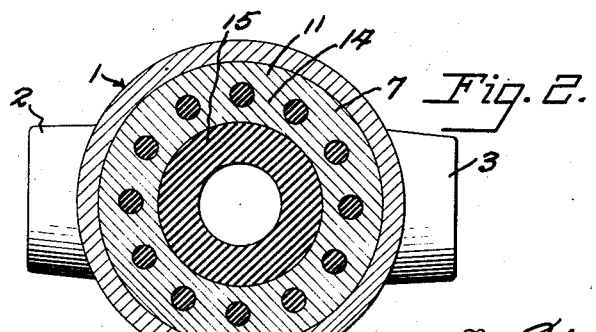
Inventor.
E. J. Roach
By Mason Fenwick & Lawrence
Attorneys Patented Oct. 10, 1939

2,175,648

UNITED STATES PATENT OFFICE 2,175,648

BLOW-OUT PREVENTER FOR CASING HEADS

Edmund J. Roach, Beaumont, Tex.

Application January 18, 1937, Serial No. 121,190

5 Claims. (Cl. 166—14)

This invention relates to blow-out preventers for casing heads, of that type which include a flexible seal between the wall of the casing head and the tubing which normally extends into the well through the casing head.

One of the objects of the invention is the provision in apparatus of the type described of a packing member so constructed as to have a definite and determined seating position regardless of the weight of the tubing.

Another object of the invention is to provide a packing member, the sealing pressure of which is independent of the weight of the tubing.

A further object of the invention is to provide that the weight of the tubing shall be carried entirely by the casing head proper.

A further object of the invention is to provide a packing unit in which a metallic seating member and the rubber or the like sealing member are integrally molded.

Other objects of the invention will appear as the following description of preferred and practical embodiments thereof proceed.

In the drawing through the several figures of which the same characters of reference have been employed to designate identical parts:

Figure 1 is a vertical section through a casing head embodying the features of the present invention;

Figure 2 is a cross section taken along the line 2—2 of Figure 1 and

Figure 3 is a vertical section taken through a modified form of the invention.

Referring now in detail to the several figures and first adverting to that form of the invention illustrated in Figures 1 and 2, the numeral 1 represents a casing head having the usual lateral outlets 2 and 3 and above the outlets a hollow extension 4 having a cylindrical bore coaxial with the casing head. The lower portion 5 of the inner wall of the extension 4 tapers downwardly and in an inward direction. Above this tapering portion, the extension 4 is counterbored to provide an annular upwardly facing and preferably inclined shoulder 6 which forms a seat for a packing member 7. The intermediate portion 8 of the inner wall of the extension 4 is preferably cylindrical. The upper portion 9 is counterbored and internally threaded to receive a ring nut 10.

The packing member comprises a unitary structure including the metallic cylindrical shell 11 slidably fitting the cylindrical portion of the bore of the extension 4 and having a seat 12 cooperating with the shoulder 6 to form a seal and a support for the packing member. The shell 11 is formed with inwardly extending perforated flanges or webs 13 and 14 about which the flexible packing element 15 of rubber or the like is molded, integrating the shell and rubber into a unitary structure. The packing element 15 is formed with an axial bore 16 somewhat smaller than the column of tubing which is designed to pass through it so that it forms a sealing joint with the surface of the tubing.

The packing element 15 is preferably formed with an annular channel 17 in its lower side defining inner and outer skirts 18 and 19, the former of which depends within the casing head while the latter is compressively conformed to sealing contact with the tapered portion 5 of the inner wall of the extension 4. The channel 17 forms a space into which the depending skirt 18 may be displaced when enlargements on the surface of the tubing such as couplings are required to pass through the packing member in the withdrawal or insertion of the tubing.

In operation, the unitary packing member is inserted in the casing head and the ring nut 10 is screwed down upon the upper end of the shell 11 and the rubber packing element 15, forcing the shell into seating position upon the shoulder 6 and forcing the outer skirt 19 to conform to the tapered surface of the inner wall of the casing head. The fact that the ring nut and shell are independent elements permits the packing member to be forced into sealing position nonrotatively preventing scarifying of the seating surfaces of the shoulder and shell and avoiding frictional distortion of the outer skirt 19 of the packing element against the corresponding portion of the wall of the casing head extension.

The ring nut 10 is formed with a cylindrical chamber 20 in its upper end to receive a slip bowl 21. The inner wall 22 of the slip bowl tapers downwardly and inwardly and receives a plurality of chucks or wedges 23 having teeth 24 on their confronting faces and being adapted to surround and hold the column of tubing. Through the threaded connection between the ring nut 10 and the upper portion 9 of the inner wall of the casing head, the weight of the tubing is transmitted direct to the casing head and is not imposed upon the packing member.

In that form of the invention shown in Figures 1 and 2 the casing head is further packed against leakage by a hood 25 screwing externally upon the upper end of the extension of the casing head as at 26 and having a stuffing gland at its upper end comprising the customary packing rings 27 compressed by a nut 28 operating against a follower 29, the packing rings making intimate contact with the central tubing. It is obvious that when it is desired to remove or reinsert the tubing, the stuffing gland would have to be dismantled or the hood unscrewed from the casing head extension.

Referring now to Figure 3, the casing head extension 30 tapers downwardly and inward as at 31, substantially the entire tapered surface constituting a seat for the packing member 32. Said packing member is an integral molded unit similar to the packing member 15 described in connection with Figures 1 and 2 comprising a shell 33 having the internal perforated flanges 34 embedded in the matrix of the rubber packing element 35. The shell 33 has a conical outer surface corresponding to the taper of the casing head and the packing element 35 is formed with an annular channel 36 defining inner and outer skirts 37 and 38. A rigid follower washer 39 rests on top of the shell 33 and flexible packing element. The bottom 40 of the slip bowl 41 rests upon the follower washer and the slip bowl has an internally threaded flange 42 engaging the externally threaded upper end 43 of the casing head extension. As the slip bowl is screwed down upon the casing head extension, it forces the follower washer against the packing member and brings the shell 33 down into seating relation with the tapered wall 31 of the casing head.

At the same time the outer skirt 38 of the flexible packing element is conformed to the tapered wall 31 so that the metallic and non-metallic parts of the packing member may be said to make a composite sealing contact with the tapered wall 31. Since the shell 33 is rigid it seats in an invariable and definite position relative to the tapered wall of the casing head.

In this form of the invention chucks or wedges 44, similar to those described in the first form of the invention cooperate with the tapered interior side wall of the slip bowl for suspending the tubing.

It will be understood by those skilled in the art that the details of construction as described in the foregoing specification are merely by way of example and not to be construed as limiting the scope of the invention as defined in the appended claims.

What I claim is:

1. Casing head including a hollow extension having on its inner wall an annular seating shoulder for a metallic seating element and having its inner wall below said shoulder downwardly and inwardly tapered forming a seat for a flexible packing element, a packing unit including a rigid outer shell having a seat forming a sealing joint with said shoulder, and a packing element of elastic material unitary with said shell having a bore coaxial with and offset inwardly relative to said shell and adapted to compressively embrace tubing extending through said casing head, said packing element being formed with an annular channel in its lower face defining inner and outer skirts, said outer skirt forming a seal with the tapered portion of the wall of said casing head extension.

2. Casing head including a hollow extension having on its inner wall an annular seating shoulder, a packing unit including a rigid outer shell forming a sealing joint with said shoulder and a flexible packing element of elastic material unitary with said shell, having a bore coaxial with and offset inwardly relative to said shell and adapted to compressively embrace tubing extending through said casing head, and a ring nut screwing to said casing head extension and applying longitudinal pressure to said packing member for non-rotatively pressing it to its seat.

3. Casing head as claimed in claim 2, including a slip bowl carried by said ring nut and chucks in said slip bowl for clampably engaging said tubing, said packing member being relieved from the weight of said tubing through the threaded connection between said ring nut and said casing head.

4. Casing head including a hollow extension having on its inner wall an annular seating shoulder, a packing unit including a rigid shell having a seat forming a sealing joint with said shoulder and a packing member of displaceable material molded to said shell.

5. Packing member for a casing head construction comprising a metallic seating element in the form of a shell having inwardly disposed flanges and a flexible rubber packing element molded with said shell so as to embed said flanges.

EDMUND J. ROACH.